United States Patent

[11] 3,591,950

[72] Inventor Ernst Weichel
Bahnhofstr. 1, 7326, Heiningen Kreis, Goppingen, Germany
[21] Appl. No. 672,487
[22] Filed Oct. 3, 1967
[45] Patented July 13, 1971
[32] Priority Oct. 4, 1966
[33] Germany
[31] W42,517

[54] LOADING CAR WITH TAKEUP MEMBER OPERATING OUTSIDE THE VEHICLE TRACK
18 Claims, 34 Drawing Figs.

[52] U.S. Cl. ................................................. 56/364, 56/344
[51] Int. Cl. ................................................. A01d 89/00
[50] Field of Search ..................................... 56/344, 359

[56] References Cited
FOREIGN PATENTS
1,425,753 12/1965 France .......................... 56/364
1,215,994 5/1966 Germany ....................... 56/364
1,215,996 5/1966 Germany ....................... 56/364

Primary Examiner—Louis G. Mancene
Assistant Examiner—J. N. Eskovitz
Attorney—McGlew and Toren ABSTRACT: A tractor-drawn crop carrying vehicle has a load receiving surface, a conveyor duct discharging upwardly onto the receiving surface and having a width coextensive with that of the receiving surface, conveying means operable in a conveyor duct to move harvested material along the duct to the receiving surface, a crop receiving drum, a frame mounting the drum and a transverse conveyor device conveying material from the receiving drum to the conveyor duct. The frame is mounted on the vehicle for movement between a first position, in which the drum extends perpendicularly to the path of vehicle movement and completely to one side of the vehicle, and a second position, in which the drum also extends perpendicularly to the direction of vehicle movement but is retracted beneath the vehicle. Releasable bracing and locking means are provided for maintaining the frame and the drum in each of the two positions. Various auxiliary elements cooperate with the drum, the transverse conveyor device and the conveyor duct, and may include, for example, cutting means operable to sever the harvested material as it is moved laterally into the conveyor duct.

INVENTOR.
ERNST WEICHEL

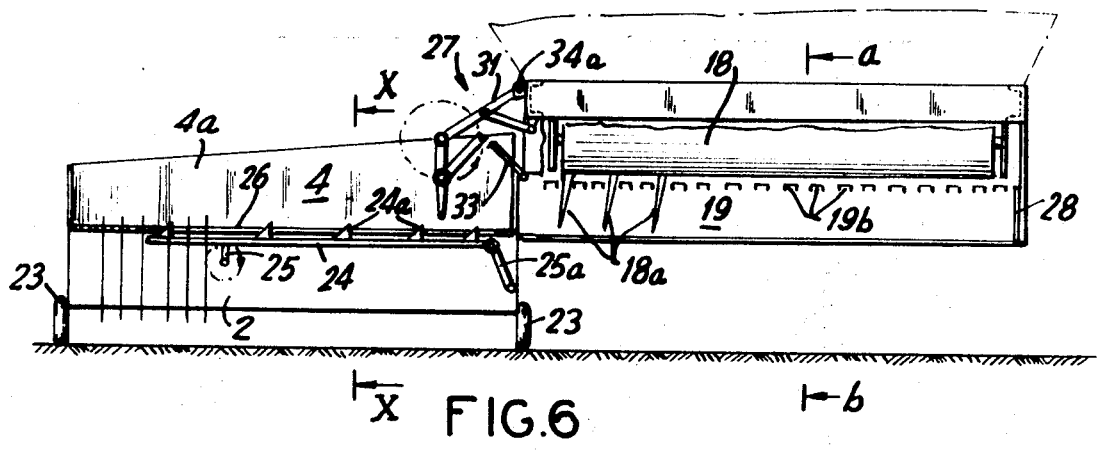
FIG.6
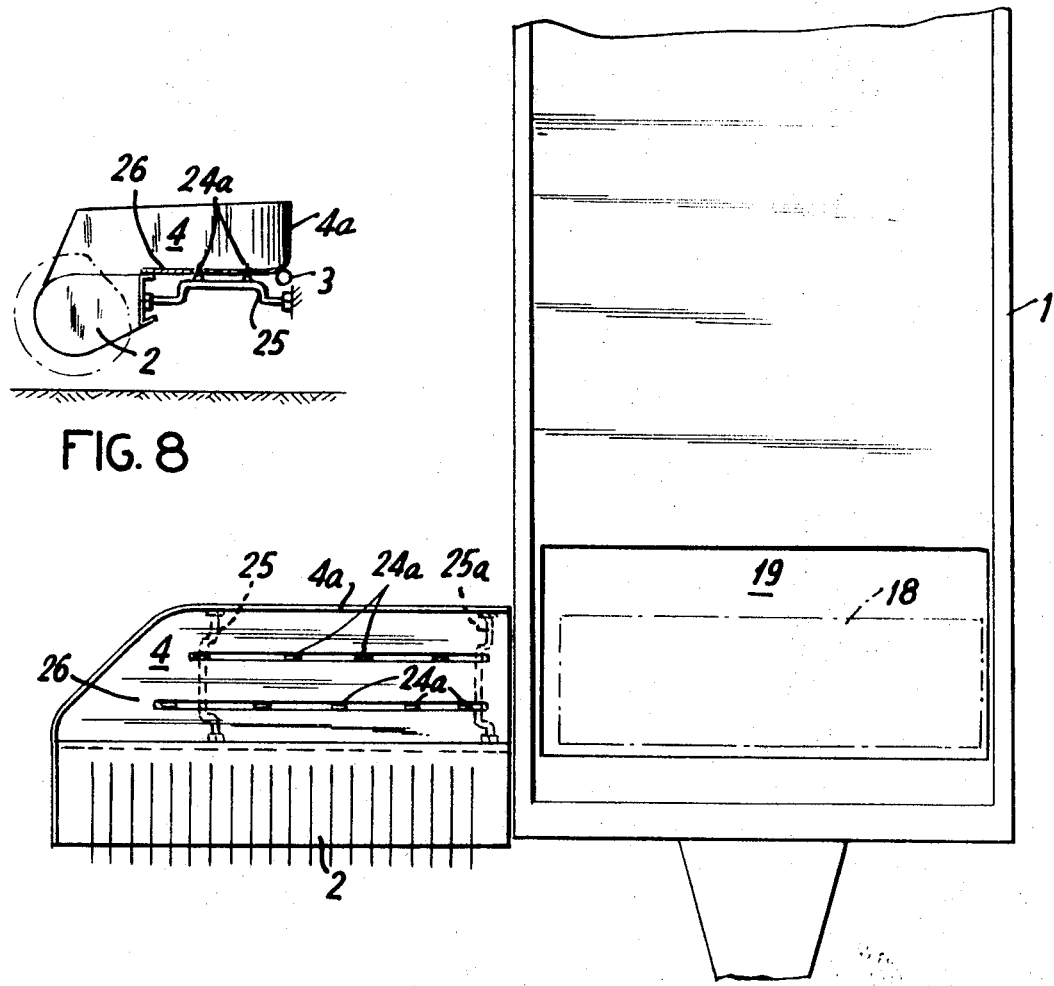
FIG.8
FIG.7
INVENTOR.
ERNST WEICHEL

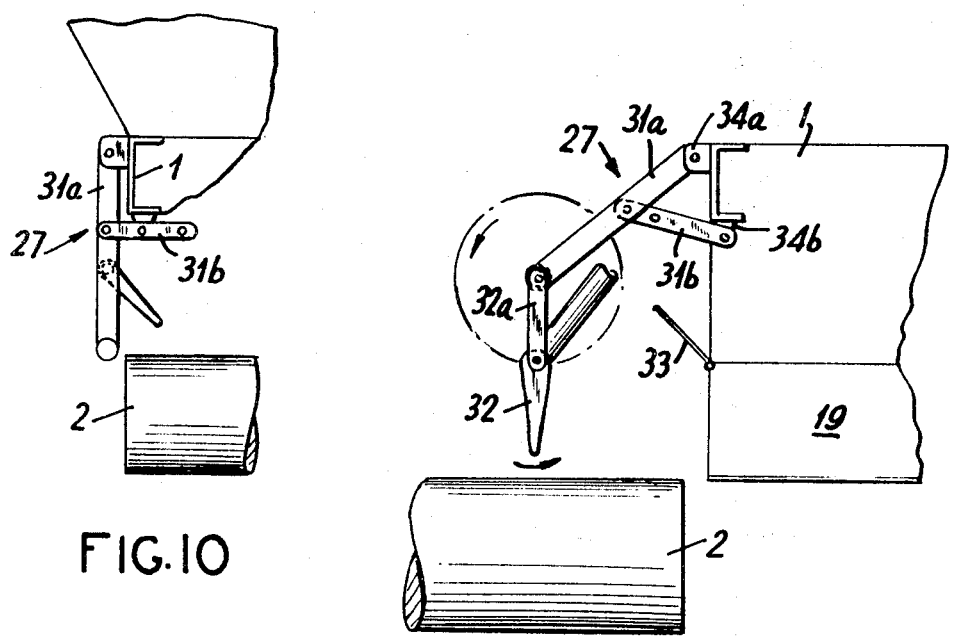
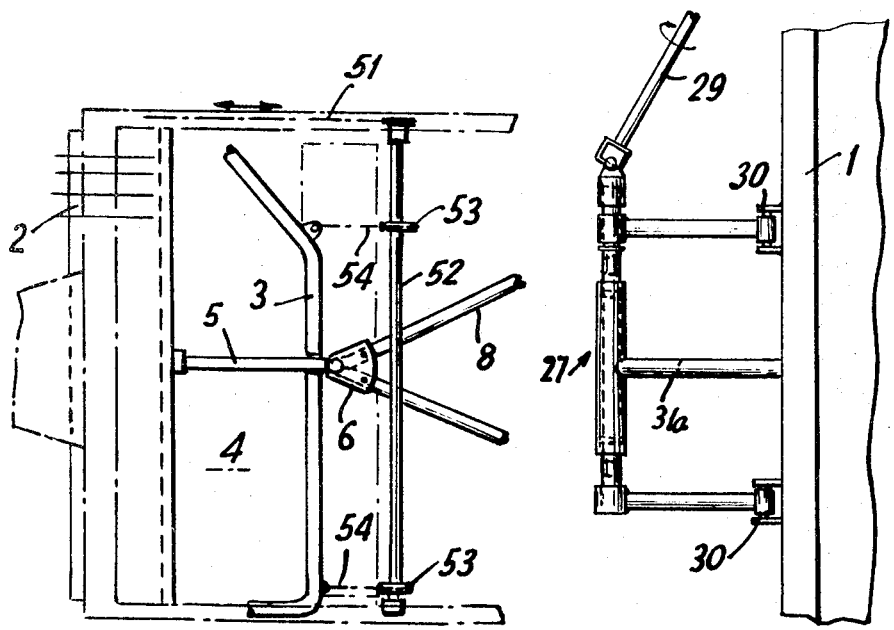

INVENTOR
ERNST WEICHEL

BY
McGlew & Toren
ATTORNEYS

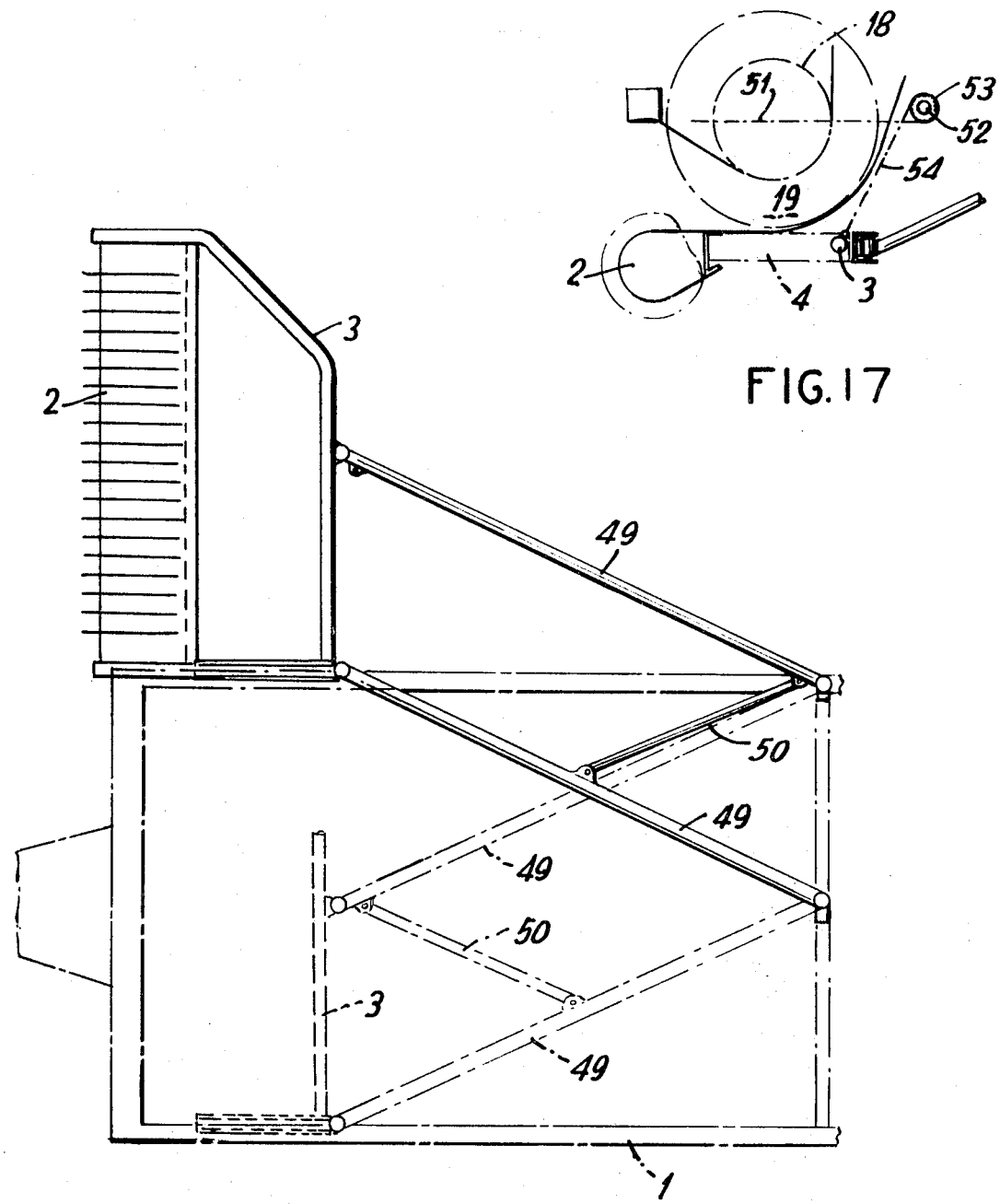

INVENTOR.
ERNST WEICHEL
BY
McGlew & Toren
ATTORNEYS

LOADING CAR WITH TAKEUP MEMBER OPERATING OUTSIDE THE VEHICLE TRACK

BACKGROUND OF THE INVENTION

It is known to provide a crop carrying vehicle with a receiving drum operating in front of, or beneath, a conveyor duct having conveyor means therein. The receiving duct is mounted in a frame movable transverse to the direction of movement of the vehicle, which may be self-propelled or tractor drawn. The frame carrying the drum is movable from a position beneath the vehicle into a position laterally extended from the vehicle and in which a transverse conveyor device conveys the harvested material, received from the drum, to the conveyor duct.

With harvesting or crop carrying vehicles of this type, it is possible to pick up, in particular, cereals and leafy vegetables, from the ground or to harvest them from the crop, and to convey them, without any further ground contact, into the cargo space of the vehicle. This is particularly expedient when the material is spread in the field in very high swathes, or if the material is to be cut with a mower mounted on the tractor and projecting laterally therefrom, with the swathes to be loaded, all in a single operation. Such a method is also necessary in the case of root vegetables which are particularly sensitive to contamination, for example, beets, sugar beet leaves, field vegetables, or very long-stalked materials, such as cane sugar or corn.

Known crop harvesting vehicles usually are equipped with a receiving element working in the vehicle track, so that a tractor pulling the crop harvesting vehicle must move over the harvested material which is usually spread in swathes on the ground. Although the tractor wheels run on the ground to the left and to the right of the swathes, so that the tractor does not have to run directly over the harvested material, difficulties are encountered, particularly in the case of a tractor with only a small ground clearance or when the rear wheels of an attached vehicle or vehicle train cannot run exactly in the track of the front wheels, as when working on a slope.

For this reason, it has been tried to provide known crop carriers or harvesters with a laterally swinging pulling device so that the vehicle can move in the track of a tractor, when on the road, but can be swung laterally next to the tractor track when loading in the field. The receiving element, arranged beneath the crop harvesting vehicle, can pick up harvested material next to the track of the tractor. Although in some operations, simultaneous moving and picking up of the same swathes is possible and large swathes could still be picked up, for example, in a flat terrain, over which the tractor would no longer move, these machines have the disadvantage that a very strong lateral pull acts on the tractor, since not only the empty harvesting vehicle but also the entire effective load is attached laterally to the tractor and the maneuverability of the machine is thus greatly impaired. For this reason, these laterally swinging harvesting vehicles are not suitable for use with small and lightweight tractors, or are not suitable for use on hilly terrain, on moist ground, or for operation by unskilled workers.

There are also known machines wherein the harvested material is moved laterally on the ground, by laterally operable loading rake elements or feed elements, so that the harvested material is brought into the working range of a receiving drum of a crop carrying vehicle attached in line with a tractor or the like. These machines have the disadvantage that the harvested material comes in contact with the ground during the lateral transportation, and thus is exposed to contamination.

Laterally attached machines, supported on their own undercarriage, are also known. They receive the harvested material, raise it laterally on the vehicle and push it into the cargo compartment or blow the material into the cargo compartment. These machines have the disadvantage that they must be attached to the vehicles for loading of each individual vehicle, and then detached again, which requires considerable preparation periods or times.

A laterally attached receiving and conveyor device is also known, wherein the laterally received material is pushed, in one or several conveyor troughs and close to the ground, beneath the frame of the crop carrying vehicle and without ground contact, into the working range of the receiving or conveyor drum. Although this machine represents considerable progress, it still has the disadvantage that it must be attached differently during working period than during transportation on the road, so that preparation times are required after the loading of each vehicle. For this reason, this type of device is suitable only for operation with large tractors operating over large areas.

In accordance with another proposal, the carrying vehicle is secured behind the tractor, and a single receiving drum is extended laterally during the work, together with a transverse conveyor device arranged behind the receiving drum, so that the receiving drum can feed the crop material to the carrying vehicle over the transverse conveyor device opening in to one side of the cargo chamber. An additional conveyor element can be arranged in the lateral inlet of the cargo chamber. On the road, the receiving drum is turned about a vertical axis beneath the load carrying surface of the carrying vehicle, and locked in such a way that it does not project beyond the lateral edge of the carrying vehicle during road transportation. It is also possible to slide the receiving drum and the transverse conveyor device, like a carriage, beneath the carrying vehicle, or to lift them about a horizontal axis.

This proposal has the disadvantage that the harvested material can only be received laterally next to the tractor, that the guidance of the receiving drum, in its operating position on the ground, is insufficient, and that the construction of the device for driving the receiving and transverse conveyor device, and for lifting out the receiving drum, is no longer possible or possible only at greatly increased expense. In addition, this device has the disadvantage that the harvested material is fed to the cargo chamber only at one corner. Moreover, an expensive special design of scraper bottom is required.

SUMMARY OF THE INVENTION

This invention relates to crop carrying or harvesting vehicles and, more particularly, to a novel and improved vehicle of this type in which the crop receiving drum and an associated transverse conveyor device may be selectively positioned either alongside the vehicle or beneath the vehicle and, in both positions, be operable to deliver material picked up to a conveyor trough leading upwardly to a cargo space on the vehicle.

The objective of the present invention is to avoid the mentioned disadvantages of known machines of this type and to provide a crop carrying vehicle with lateral reception of the harvested material, and which can remain constantly attached to a tractor immediately behind the latter. Additionally, the material can be received by the vehicle without ground contact in the track of the tractor, or laterally next to the track of the tractor or carrying vehicle. Furthermore, the vehicle requires little preparation time when changing from the driving position to the operation position, and vice versa, at its operating functions can be supervised and executed from the driver seat of the tractor. The crop receiving element is guided satisfactory along the ground, and is protected to a great extent against damage, when striking against obstacles. The crop receiving element can be equipped with an inexpensive drive, and can be easily lifted out at the end of the field both in the inner working position and in the outer working position. In addition, the known advantages of a crop carrying vehicle, where the cargo chamber is filed from the bottom with regulable pressure through a duct which is about as wide as the load carrying surface of the vehicle, are retained in the invention of the vehicle.

This problem is solved, in accordance with the invention, in that the receiving drum, when in its retracted position beneath the carrying vehicle, is also operable to charge material into the conveyor duct which extends over the entire width of the load carrying surface of the vehicle.

An object of the invention is to provide an improved tractor-drawn crop-carrying harvesting vehicle.

Another object of the invention is to provide such a vehicle in which the material to be harvested may be picked up in the track of the vehicle or in a track laterally alongside the track of the vehicle.

A further object of the invention is to provide such a vehicle including a relatively inexpensive and rugged receiving drum and associated transverse conveyor device mounted in a frame, the receiving drum extending transversely of the direction of movement of the vehicle and the frame being mounted for movement between a first position in which the receiving drum is disposed laterally outside the vehicle and a second position in which the receiving drum is disposed beneath the vehicle, the receiving drum, in both positions, extending transversely of the direction of vehicle movement.

Another object of the invention is to provide such a vehicle including releasable locking means effective to maintain the drum-carrying frame in each of its positions.

For an understanding of the principles of the invention, reference is made to the following description of typical embodiments thereof as illustrated in the accompanying drawings.

BRIEF DESCRIPTION OF THE DRAWINGS

In the Drawings:

FIG. 6 is a front elevation view of still another embodiment of the invention;

FIG. 7 is a top plan view of the embodiment of the invention shown in FIG. 6;

FIG. 8 is a sectional view taken on the line X-X of FIG. 6;

FIG. 9 is a front elevation view, corresponding to FIG. 6, but to a larger scale;

FIG. 10 is a partial sectional view corresponding to FIG. 9 illustrating the parts in a different position;

FIG. 11 is a top plan view of the embodiment of the invention shown in FIG. 9;

FIG. 16 is a top plan view illustrating a slightly modified version of the embodiment of the invention shown in FIG. 15;

FIG. 17 is a cross-sectional view illustrating a lifting arrangement;

FIG. 18 is a plan view corresponding to FIG. 17;

DESCRIPTION OF THE PREFERRED EMBODIMENTS

Figure 1:
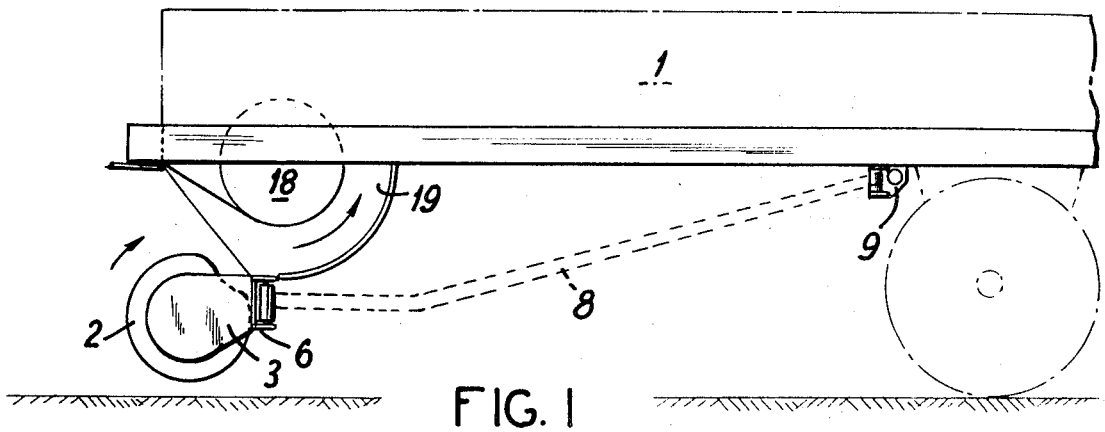
FIG. 1 is a somewhat schematic partial side elevation view of the front part of a carrying vehicle embodying the invention.
Figure 2:
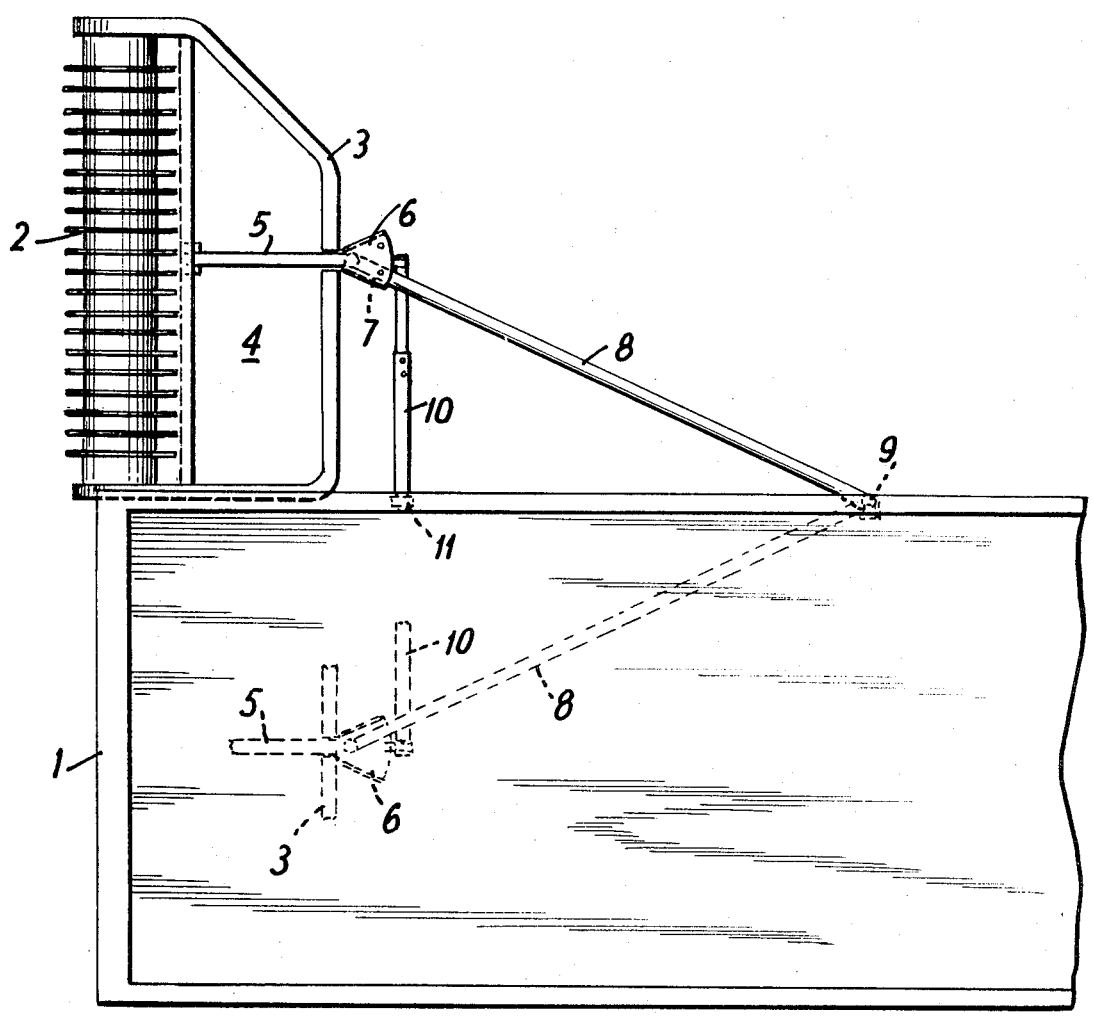
FIG. 2 is a somewhat schematic top plan view of the arrangement shown in FIG. 1, with the receiving drum extending laterally from the vehicle.

Referring first to FIGS. 1 and 2, a crop carrying vehicle 1 is illustrated as equipped with a conveyor drum 18 for moving material along a conveyor duct 19 which discharges upwardly into the crop carrying space of vehicle 1. A receiving drum 2 is supported in frame 3 which encloses or carries a transverse conveyor device 4. Frame 3 is pivotally mounted, on a pivot 5, in a coupling bit 6. Pivot 5 extends parallel to the direction of movement of vehicle 1, for adaptation of frame 3 to irregularities in the ground. Coupling bit 6 can be fixedly connected by a pin or plug 7, in either of two angular positions, with a push rod 8 which is so articulated, at a fulcrum 9 on the frame of vehicle 1 in the proximity of the vehicle axis, for example, and through the medium of a ball and socket joint, that it can be pivoted to a limited extent both in a horizontal direction and in a vertical direction. Approximately at the level of coupling bit 6 there is mounted, at a fulcrum 11 on the vehicle, a guide rod 10 which can be turned in a vertical plane and which can be connected with coupling bit 6 by a quick-action lock. Guide rod 10 also can be longitudinally adjustable.

From FIG. 2, it will be noted that pushrod 8, in the position shown in solid lines, in cooperation with guide rod 10, fixes receiving drum 2 and frame 3 with respect to vehicle 1 so that receiving drum 2 can adapt itself, in the operating position, to irregularities of the ground. In the position shown in broken lines, pushrod 8 is beneath the bottom of vehicle 1 and guide rod 10 has been turned through approximately 180°, so that receiving drum 2 is also fixed in operating position with respect to vehicle 1. Changing of receiving drum 2 from the inner to the outer position, and vice versa, can be effected manually. Receiving drum 2 is at the same level, with respect to vehicle 1, both in the inner and in the outer position. Transverse conveyor device 4 is so designed that it can be displaced, in a telescopic manner, with respect to the rear wall of conveyor duct 19 and transversely of the direction of vehicle movement.

Figure 3:
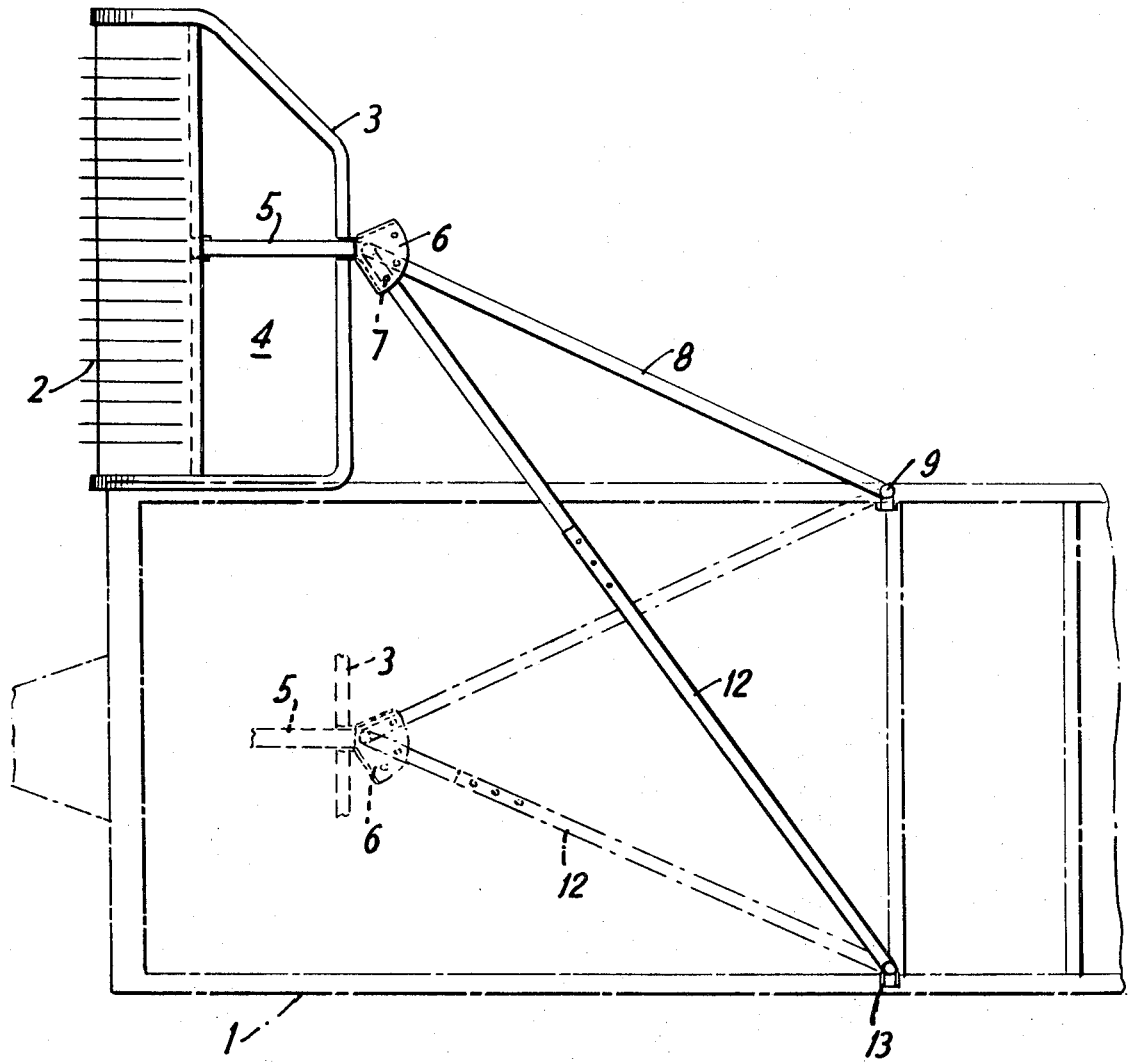
FIG. 3 is a view, similar to FIG. 2, illustrating a modified embodiment of the invention.

In the embodiment of the invention shown in FIG. 3, guide rod 10 is replaced by a second longitudinally adjustable pushrod 12, which is secured at the fulcrum 13 on the left side of vehicle 1. This has the advantage that the end of pushrod 12 secured on coupling bit or jaw 6 is not completely disengaged or disconnected during the changeover, and that it is necessary only to lock the longitudinally adjustability of pushrod 12 itself. This latter can consist, for example and in a known manner, of two telescoped tubes. The loosening and locking of such a lock can be effected automatically through known spring-loaded latches, so that extension and retraction of receiving drum 2, during a field operation, can be effected from the tractor seat by steering a corresponding curve.

Figure 4:
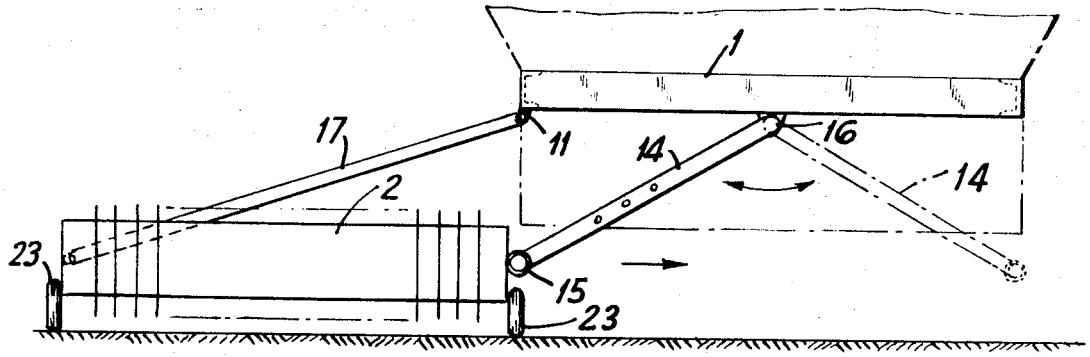
FIG. 4 is a front elevation view of another modified form of the invention.
Figure 5:
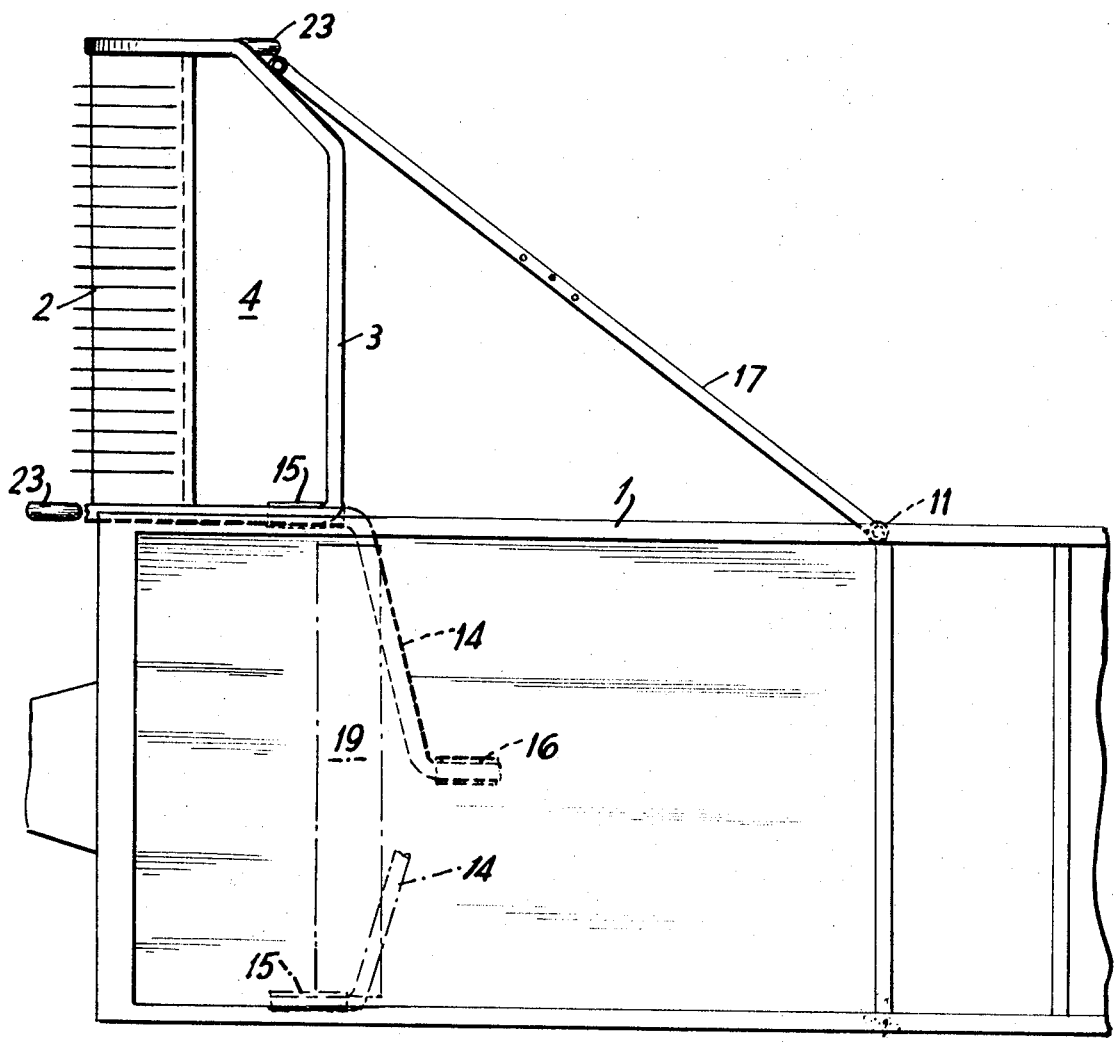
FIG. 5 is a plan view corresponding to FIG. 4.

FIGS. 4 and 5 illustrate an embodiment of the invention in which frame 3 is held, on its side facing vehicle 1, by an S-shaped guide rod 14, which can swing, in bearings 15 and 16, about axes of rotation extending in the direction of vehicle movement, and frame 3 is guided on the ground by feeler wheels 23. The outer side or end of frame 3 is engaged by a longitudinally adjustable pushrod 17 which is articulated at the fulcrum 11 and which guides frame 3 in a manner such that the latter can move in a vertical direction while maintaining the prescribed angle with respect to vehicle 1.

In the embodiment of the invention shown in FIGS. 6, 7 and 8, receiving drum 2 is guided over the ground by feeler wheels 23, and transverse conveyor device 4 is designed as known pushrods 24 which rotate about at least one crankshaft 25 and which, at their inner ends, rest either on a second crankshaft 25a or are held movably by a guide rod 25a. Pushrods 24 are arranged beneath a slotted bottom wall 26 of conveyor device 4 and are provided with prongs 24a protruding upwardly through the slots, these prongs moving the material in only one direction. A compression device 27 is secured laterally on the frame of vehicle 1, and can be designed at the same time as a conveyor device. Compressor device 27 takes material from pushrods 24 and pushes it, from the side, into conveyor duct 19. At the rear end of conveyor duct 19 there is arranged a switching or feeler flap 28 which controls coupling of a drive shaft with conveyor drum 18 responsive to pressure of material on flap 28.

Those prongs 18a of conveyor drum 18 adjoining receiving drum 2 are designed as cutting elements, so that the material, in case it should be felted, can be cut off exactly at the transition point between transverse conveyor 4 and conveyor duct 19, during lifting or rotation of conveyor drum 18, in order to avoid clogging. Transverse conveyor device 4 is provided with a vertical rear wall 4a, so that no material can fall out at the rear.

FIGS. 9, 10 and 11 show compression device 27 to a larger scale. This compression device is driven by a drive shaft 29 and is articulated on the chassis of vehicle 1 at the fulcrums 30. Device 27 is rigidly connected with the frame of vehicle 1, in its operating position, by adjustable struts 31a and 31b, and can be folded in so far toward vehicle frame 1, in its transportation position as shown in FIG. 10, that it does not project laterally to any substantial extent. Instead of the representation shown in FIG. 10, folding could also be effected in a manner such that the struts are folded down, about one or more superposed joints and in such a way that the struts are folded upward and the compression device is in transportation position in the space above the conveyor drum of the carrying vehicle. This latter embodiment, which has not been illustrated, permits using a compression device 27 that projects far out, that is, a device which already engages the material at the outer end of receiving drum 2 and conveys it in a direction toward the carrying vehicle 1.

At the inlet of conveyor duct 19, there is arranged a flap 33 which can be spring-loaded to avoid clogging. Struts 31a and 31b are secured on brackets 34a and 34b secured to the frame of vehicle 1. The actual compression element 32 can be designed as a crank rotating about a crankshaft, and controlled by known guide rods 32a.

Figure 12:
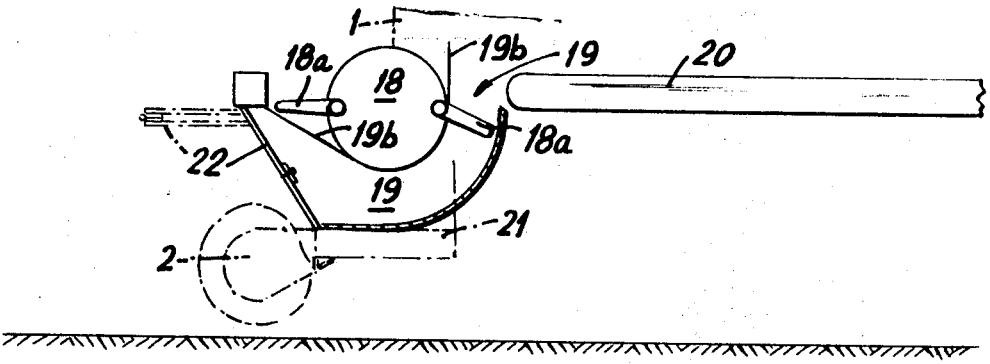
FIG. 12 is a sectional view through the embodiment of the invention shown in FIG. 6.

In FIG. 12, which is a partial section of conveyor drum 18 with prongs 18a, conveyor duct 19, and scraper bottom 20 of vehicle 1, transverse conveyor 21 is designed as an endless belt, and a subdivided flap 22 is provided and is inoperative, in the position represented in broken lines, when receiving drum 2 is retracted beneath vehicle 1. In the position shown in solid lines, flap 22 is folded down, after receiving drum 2 has been swung out laterally, in such a way that it forms, with the rear wall of conveyor duct 19, a trough closed at the bottom and whose upper cover is the known stripping lattice 19b. From here, prongs 18a of conveyor drum 18 press the material through conveyor duct 19 upwardly into the cargo or crop receiving chamber of vehicle 1.

Figure 13:
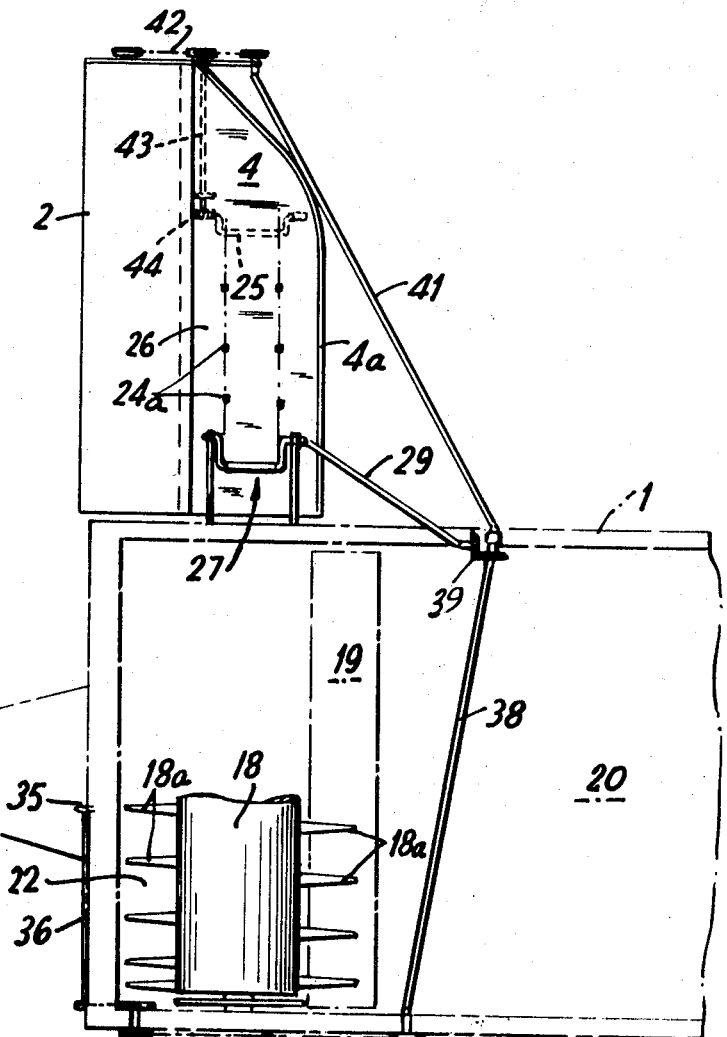
FIG. 13 is a partial top plan view, similar to FIG. 7, of the embodiment of the invention shown in FIG. 12.

FIG. 13 illustrates the driving means for the machine shown in FIGS. 6 through 12. A power input shaft 35, which is merely indicated, is driven in a known manner through a drive shaft and from a prime mover which has not been shown. In a known manner, an adjoining cross-shaft 36 drives conveyor drum 18, and shaft 26 is followed by a chain drive 37 from whose rear sprocket 37a there extends a drive shaft connected to a distributor gearing 39. A drive shaft 29 extends from gearing 39 to the crank drive of compression device 27, and another drive shaft 41 extends from gearing 39 to a chain drive 42 arranged at the outer side or end of frame 3. Chain drive 42 drives receiving drum 2 and, through an additional drive shaft 43, a gear 44 which is in operative connection with crankshaft 25.

Figure 14:
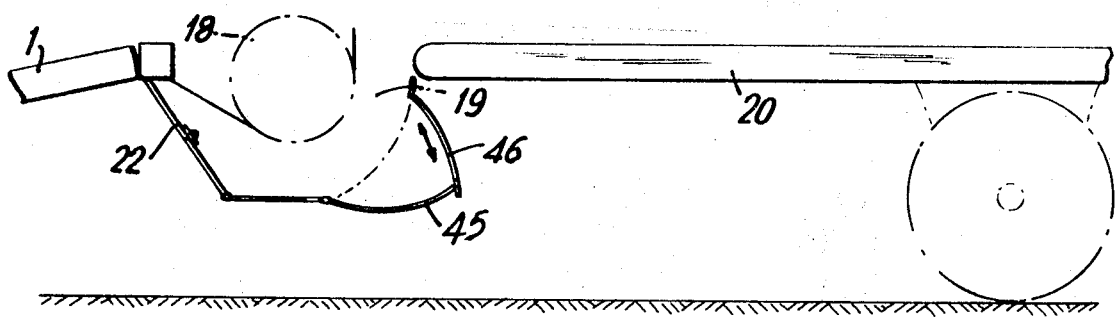
FIG. 14 is a sectional view through another embodiment of the invention similar to that shown in FIG. 12.

In the embodiment of the invention illustrated in FIG. 14, the bottom part of conveyor duct 19 is widened by a detachable hinged wall 45 and a cover 46, and closed at the front, in the manner described above, by the flap 22. This arrangement is advisable when it is desired to force the material only in larger portions, and by slowly moving conveyor elements, into the receiving chamber on vehicle 1, or when high driving speeds are required, so that there is more room for the transverse conveyance of the material in the trough of the conveyor duct.

Figure 15:
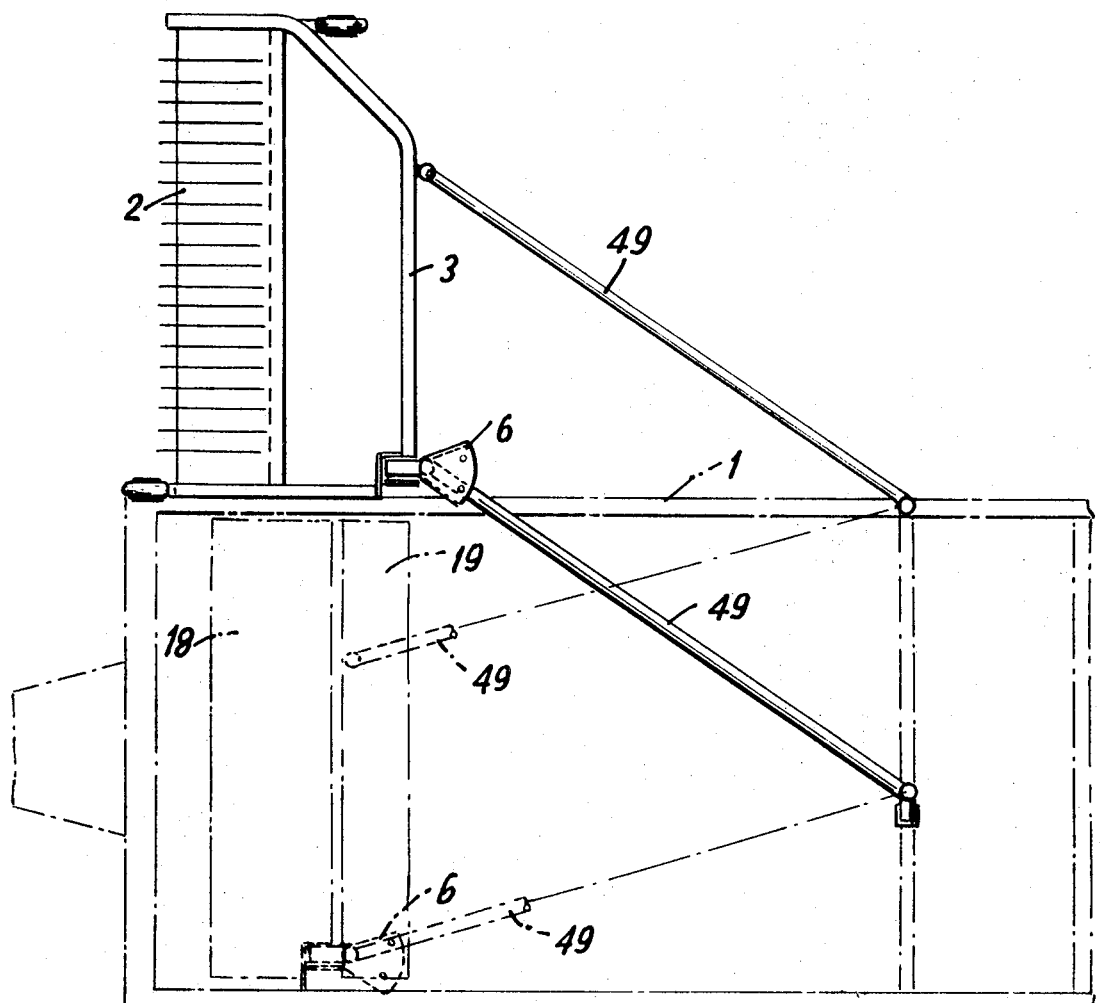
FIG. 15 is a top plan view of another embodiment of the invention.

The frame mounting arrangement shown in FIG. 15 comprises two pushrods 49 arranged in the manner of a parallelogram, and of these pushrods, only one has to be connected with coupling bit or jaw 6 on frame 3. The fulcrums of pushrods 49 are designed as universal joints.

FIG. 16 shows a similar embodiment wherein the inner and outer positions are receiving drum 2 can be rigidly fixed by transposing an intermediate strut 50.

Referring to FIGS. 17 and 18, these figures illustrate an elevating means for receiving drum 2, where removal of the drum is possible in the inner position thereof. This elevating means comprises an elevator shaft 52 extending transversely of the direction of vehicle movement and which can be rotated by a chain or cable 51, acting in the direction of vehicle movement, by mechanical means or by hand. On shaft 52 there are fixed two cable drums 53 each associated with a respective chain or cable 54 during rotation of shaft 52. Thus, frame 3 is lifted, together with transverse conveyor device 4 and receiving drum 2. Before turning frame 2 to the laterally projected position, cables 54 must be disengaged from fastenings on frame 3 by means of a spring safety hook (not shown).

Figure 19:
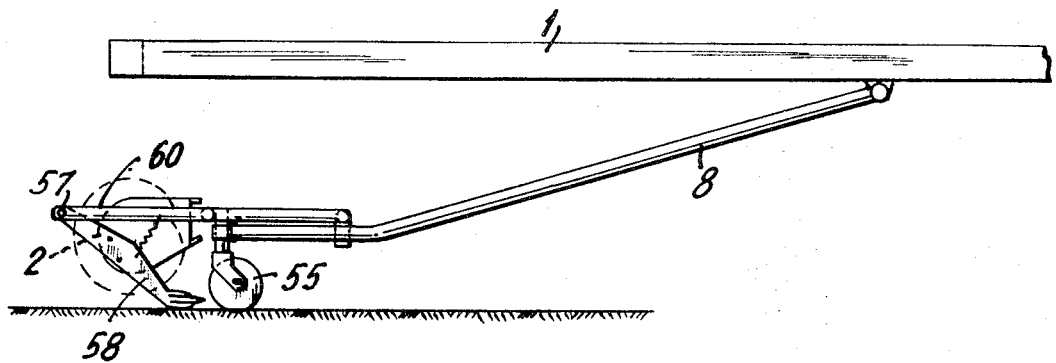
FIG. 19 is a side elevation view of another embodiment of the invention.
Figure 20:
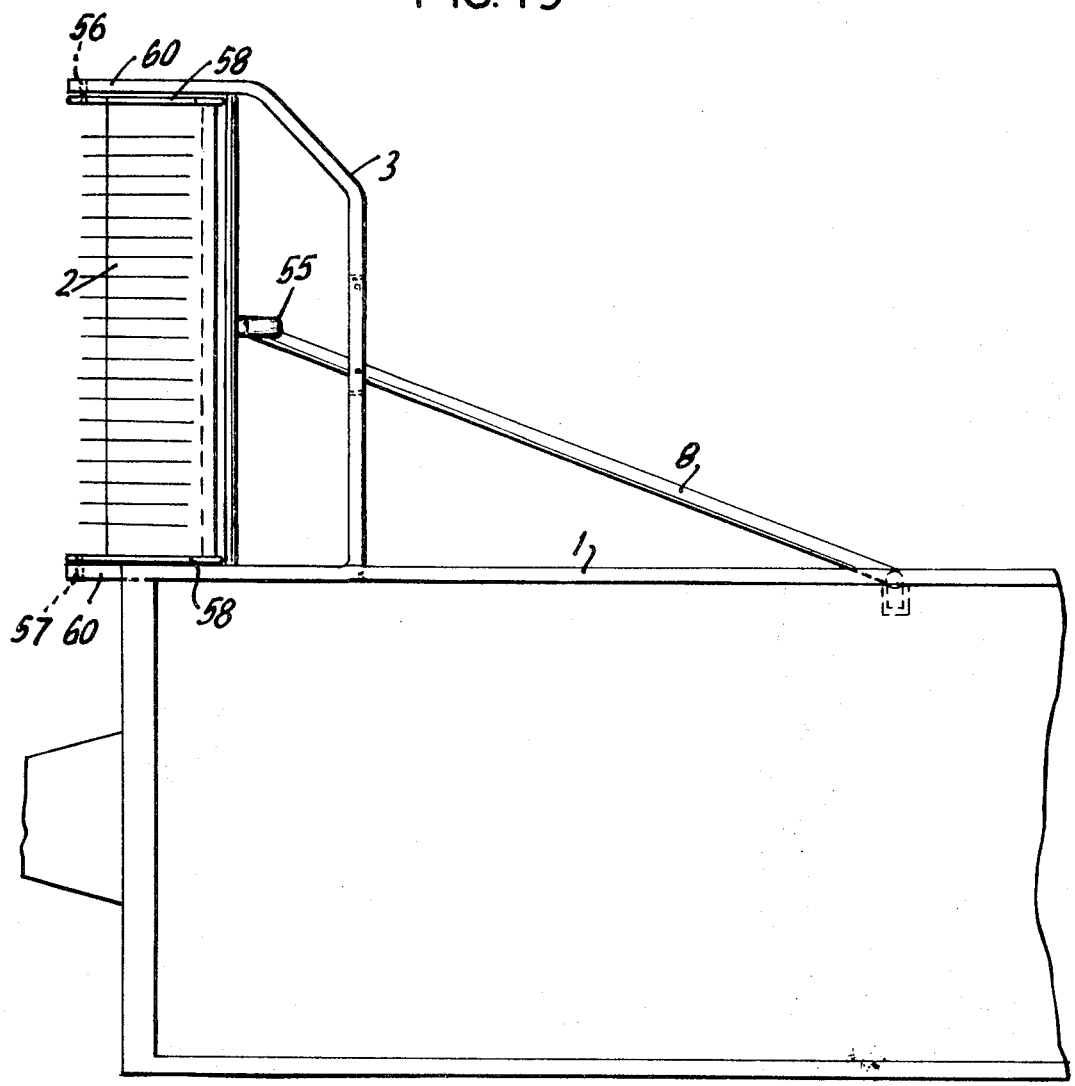
FIG. 20 is a plan view of the embodiment of the invention shown in FIG. 19.

FIGS. 19 and 20 illustrate an embodiment of the invention wherein frame 3 is guided along the ground by a feeler wheel 55 arranged at the center of receiving drum 2 and extended forwardly by two projecting arms 60 on which are articulated two additional feeler stirrups 58 in the joints 56 and 57. These support any lateral inclinations of receiving drum 2 with respect to the ground. Receiving drum 2 itself is provided with elastic prongs and secured firmly in frame 3 between arms 60. Feeler wheel 55 is designed for vertical adjustment and pivotal movement.

Figure 21:
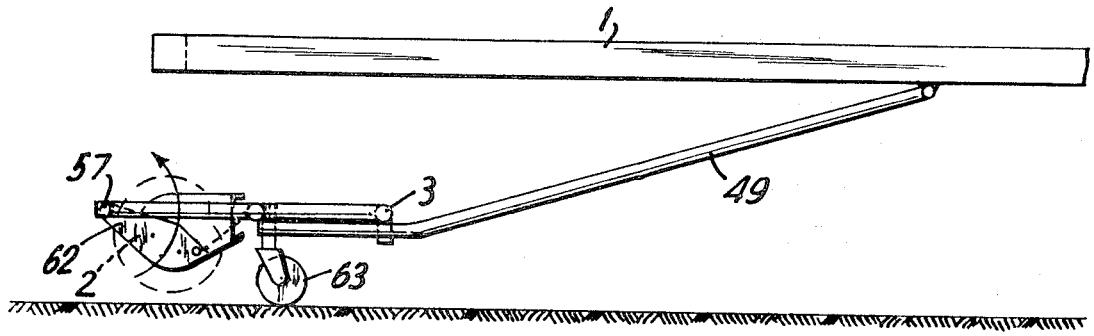
FIG. 21 is a side elevation view of a further embodiment of the invention.
Figure 22:
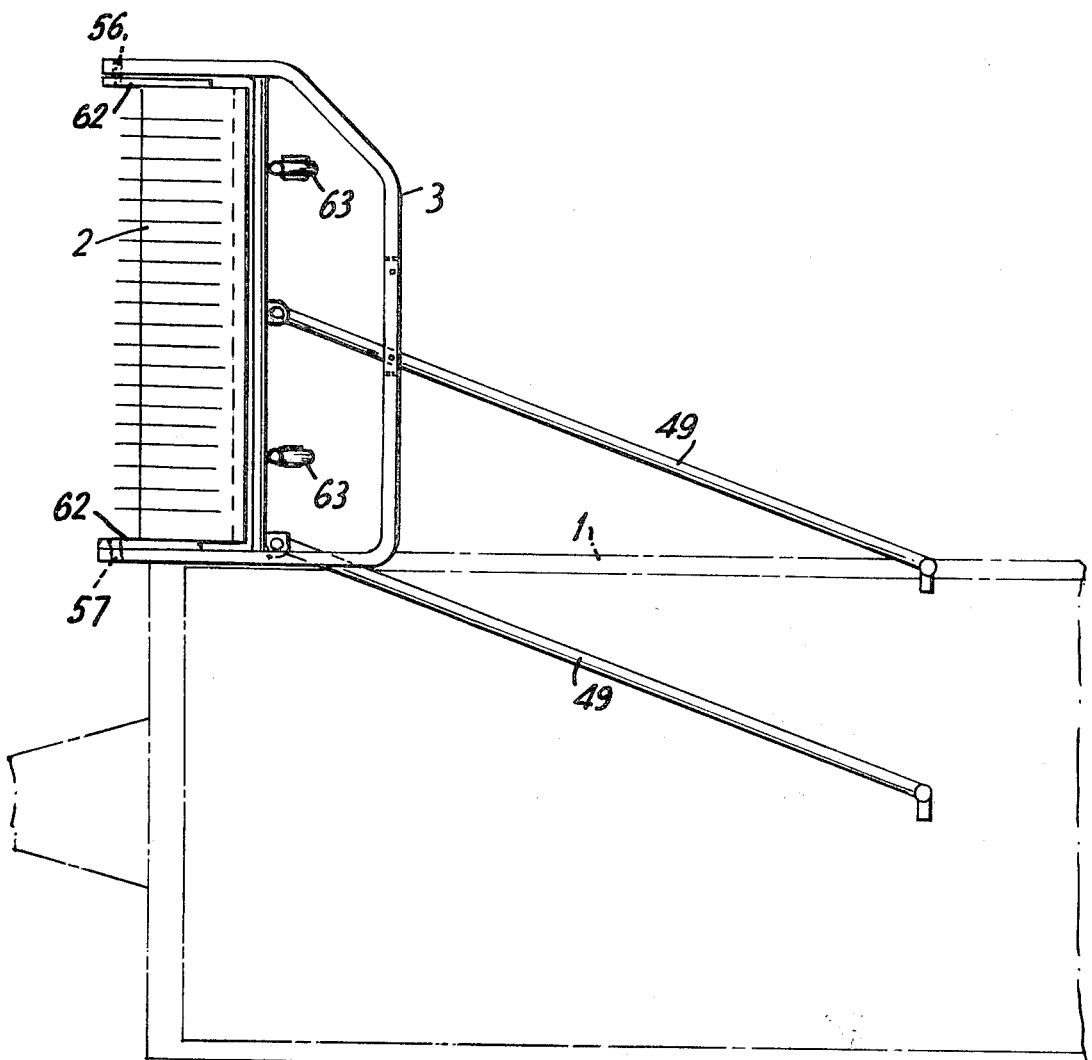
FIG. 22 is a top plan view of the embodiment of the invention shown in FIG. 21.
Figure 23:
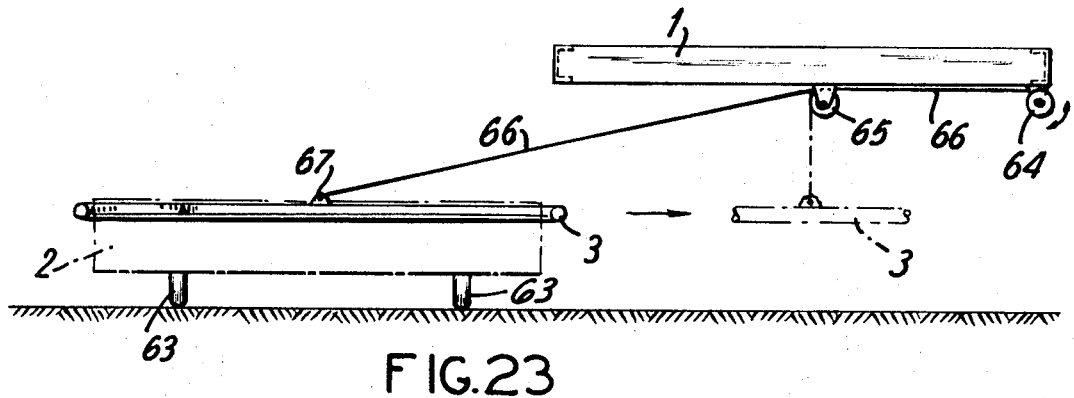
FIG. 23 is a front elevation view of another embodiment of the invention.
Figure 24:
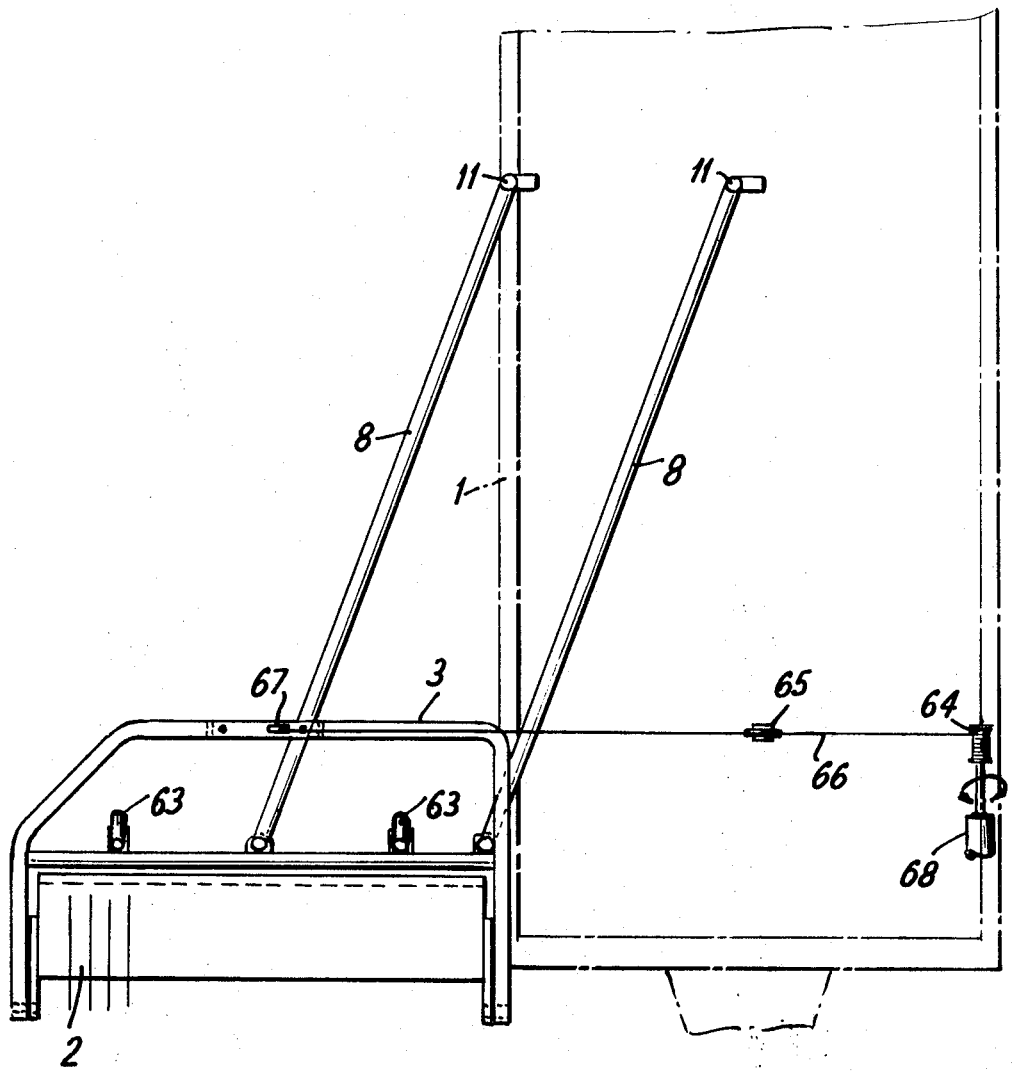
FIG. 24 is a top plan view of the embodiment of the invention shown in FIG. 23.

In the slightly modified embodiment shown in FIGS. 21 and 22, feeler stirrups 58 are omitted and receiving drum 2 is suspended swingingly on joints 56 and 57 through rockers 62. Two feeler wheels 63 are secured on frame 3. In this embodiment, receiving drum 2 can yield upwardly to the rear without being damaged, when striking against obstacles, for example, boundary stones, and can be lifted at least so far, for example, at the end of the field, and by simple means which have not been shown, such as a hydraulic elevator or a Bowden cable, that it does not come in contact with the ground when the vehicle makes a turn. In this way it is possible to design the elevator so that it can be used for higher lifting in the driving position only in the retracted position of the receiving drum (see FIGS. 17 and 18). FIGS. 23 and 24 show a modified embodiment similar to FIGS. 21 and 22, where extension of receiving drum 2 is effected after loosening a locking device (not shown) on pushrods 8 in such a way that the driver steers a curve in the field so that receiving drum 2 swings out laterally about the fulcrums 11. Retraction of receiving drum 2 also is effected from the driver's seat by operating a cable winch 64 from which a cable 66 extends over a roller 65 which is secured to frame 3 at a bolt 67. When cable winch 64 is set in operation by a driving device 68, which has not been shown in detail, cable 66 pulls, at first, receiving drum 2 laterally under the vehicle, with the drum running on the ground on feeler wheel 63. When the center position under the vehicle has been reached, and with cable winch 64 remaining in operation, frame 3 and receiving drum 2 are lifted sufficiently far that the desired ground clearance is attained.

Figure 25:
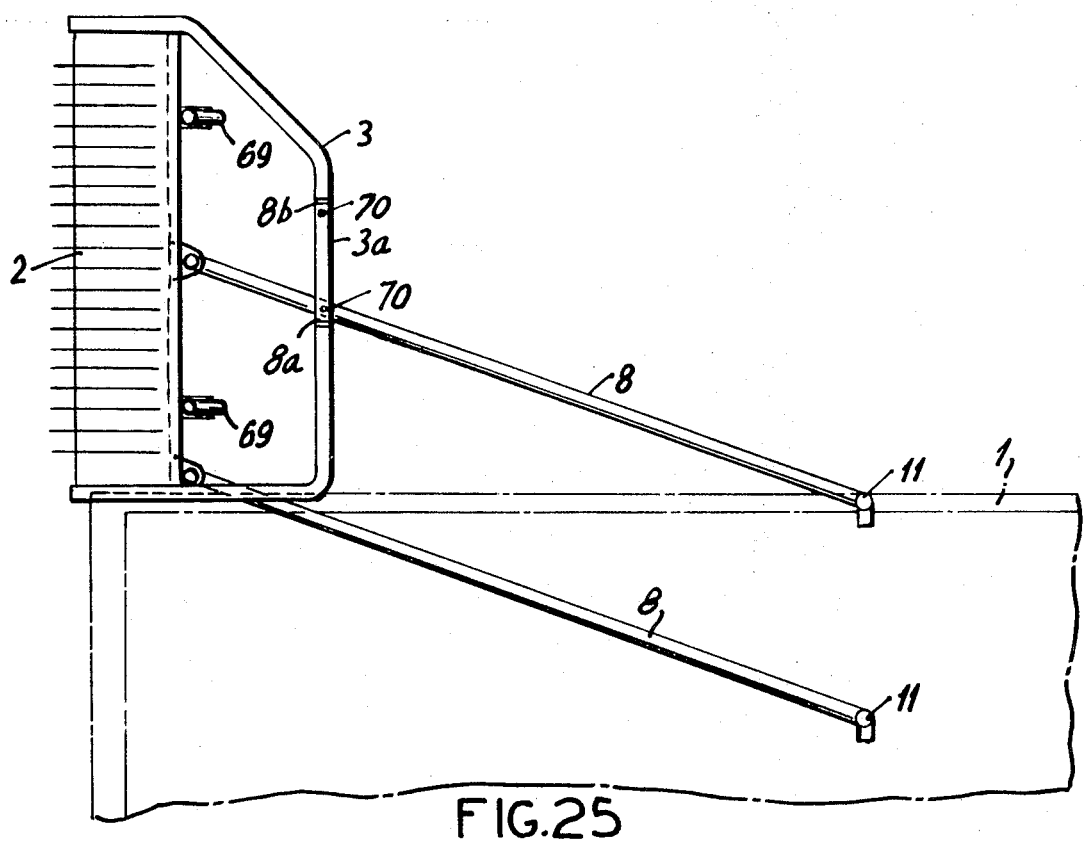
FIG. 25 is a top plan view of still another embodiment of the invention.

In the arrangement of FIG. 25, receiving drum 2 is fixedly connected with frame 3 and only frame 3 is guided over the ground by vertically adjustable and pivotal feeler wheels 69. This embodiment is more sensitive to accidental damage to the receiving drum when it strikes against obstacles, but it is simple to manufacture and meets the requirements where clear surfaces, free of obstacles, exist. On frame 3, there is arranged a stirrup 3a under which one of the pushrods 8 is so extended that it bears, in two positions 8a and 8b, on respective opposite edges of the stirrups and is retained by a plug or pin 70 or by a quick-action lock actuated from the tractor seat over a cable line, so that the respective position of receiving drum 2 can be very easily fixed.

Figure 26:
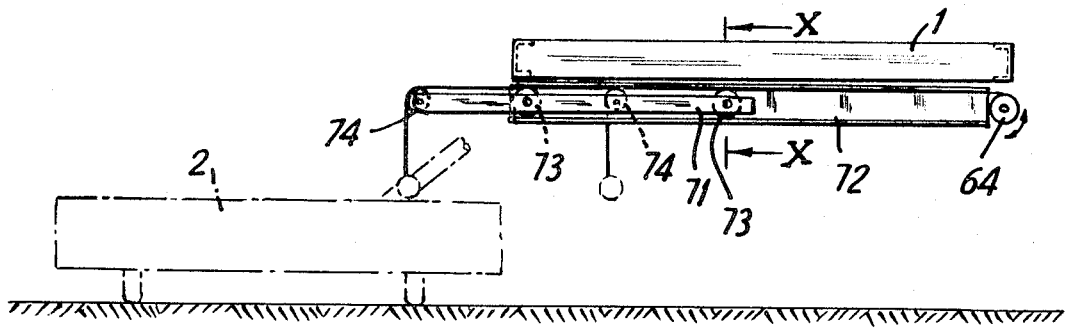
FIG. 26 is a front elevation view corresponding to FIG. 25.
Figure 27:
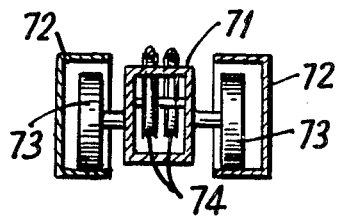
FIG. 27 is a sectional view taken on the line X-X of FIG. 26.
Figure 28:
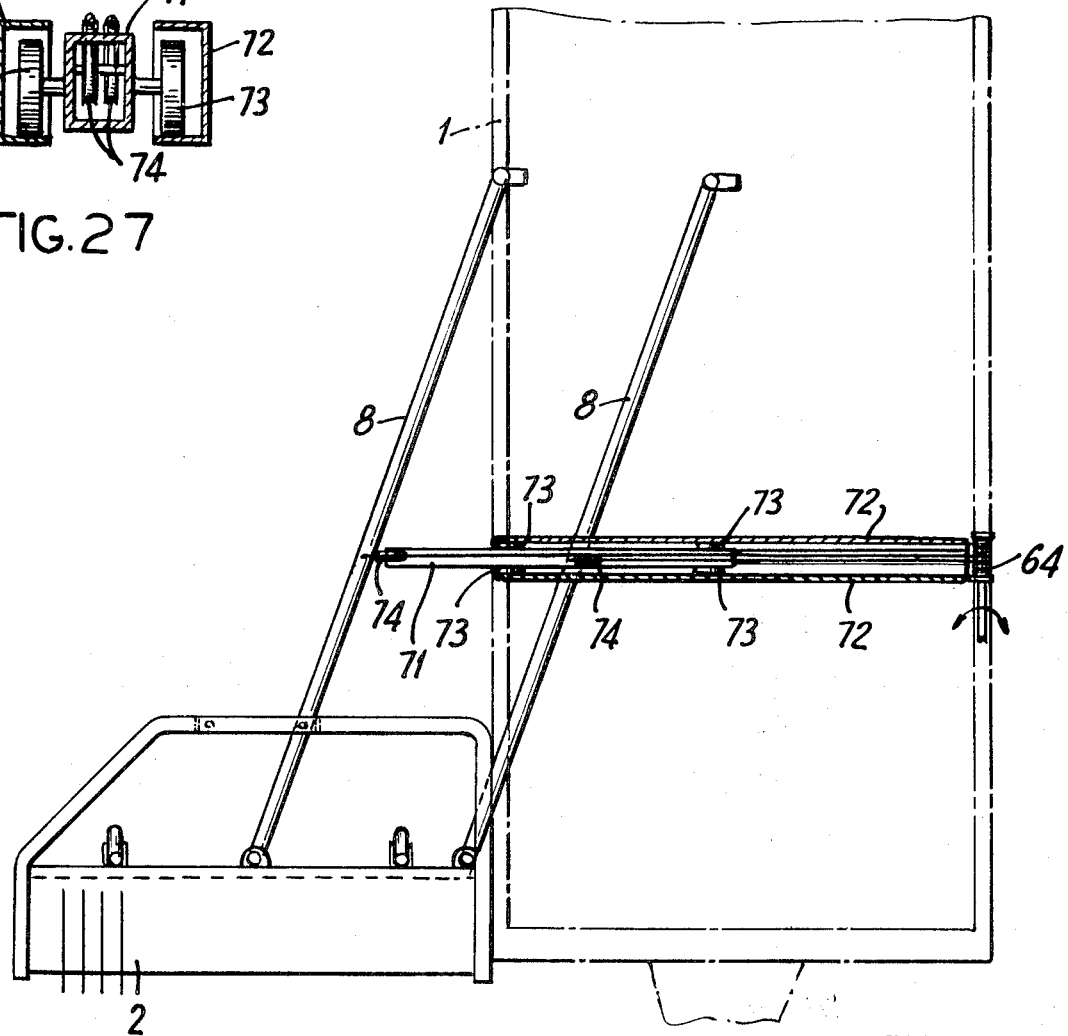
FIG. 28 is a top plan view of the embodiment of the invention shown in FIG. 26.

In the modified embodiment of the invention shown in FIGS. 26 through 28, raising of the receiving drum in the driving position is possible both in the retracted position and in the laterally extended position. Underneath the chassis of vehicle 1, there is arranged a guide 72 preferably comprising channel sections, and a carriage 71 is mounted in guide 72 by means of guide rollers 73, for movement transverse to the direction of vehicle movement. Carriage 71 carries deflecting rollers 74, and laterally of guide 72 there is arranged cable winch 64 from which two cables are wound, each of which runs over one of the deflecting rollers 74 and is secured to a pushrod 8. In the extended position of drum 2, carriage 71 is locked in guide 72 so that pushrods 8, and thus also frame 3 and drum 2 can be lifted out in the extended position also and through the medium of deflecting rollers 74. If carriage 71 is unlocked and cable winch 64 is started, in order to retract receiving drum 2, carriage 71 initially is pulled inwardly up to a stop in guide 72, this stop not being shown. When cable winch 64 continues to run, pushrods 8, and thus frame 3 with receiving drum 2 and transverse conveyor device 4, are lifted.

Figure 29:
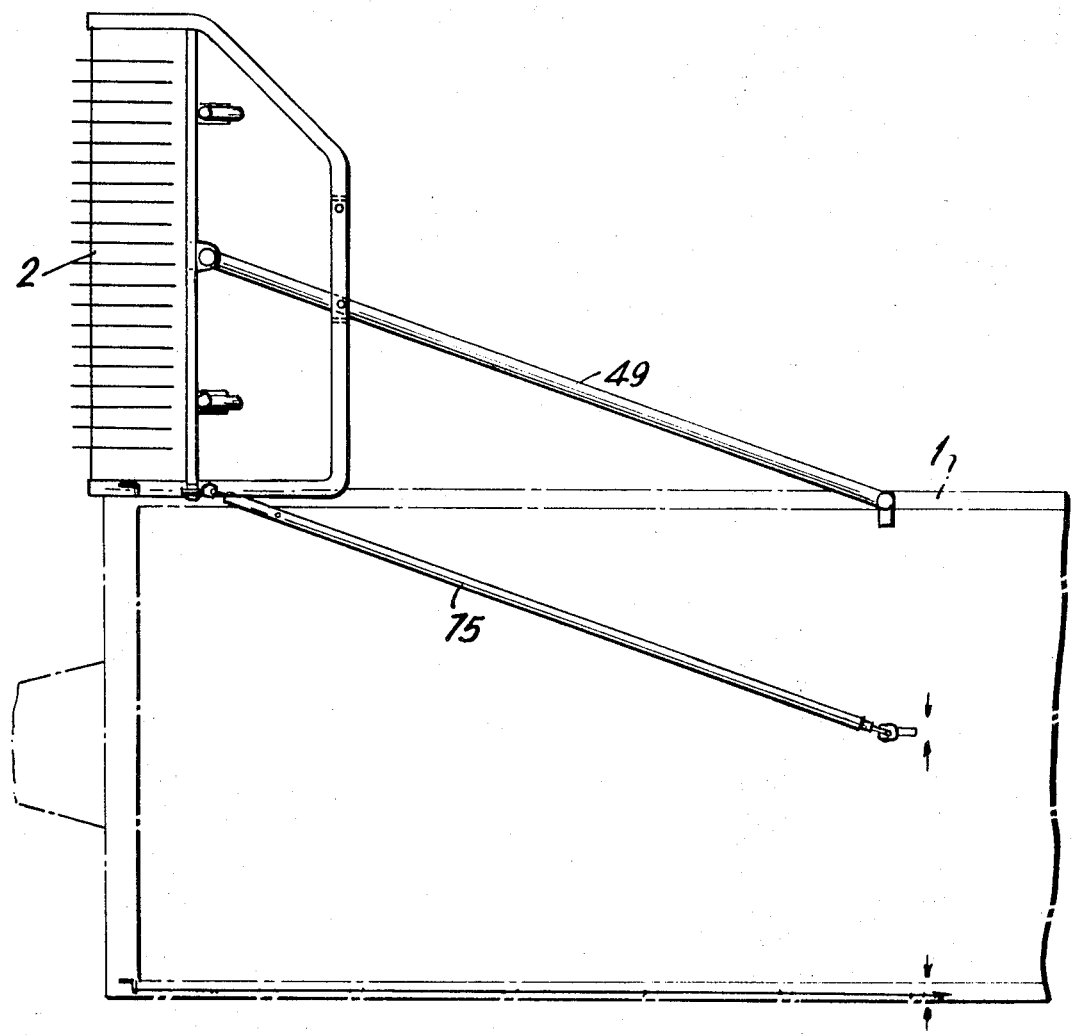
FIG. 29 is a top plan view of another embodiment of the invention.

In the embodiment of the invention shown in FIG. 29, there is a somewhat simplified drive of receiving drum 2 in transverse conveyor device 4 in that one of the pushrods 8, forming the supporting parallelogram, is designed as a Cardan drive shaft without telescopic displaceability. The second pushrod 49, that shown to the outside FIG. 29, is made stronger in this case and absorbs the main load, while the pushrod designed as a Cardan drive shaft 75 takes over additionally the function of the longitudinal fixing of the parallelogram.

Figure 30:
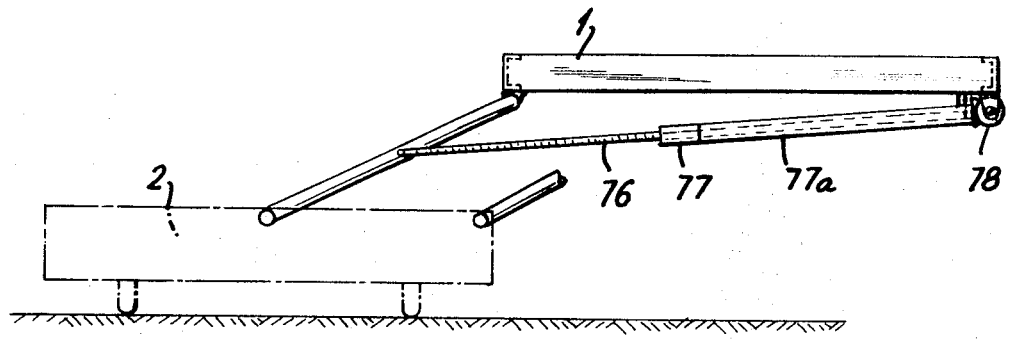
FIG. 30 is a front elevation view of still another embodiment of the invention.
Figure 31:
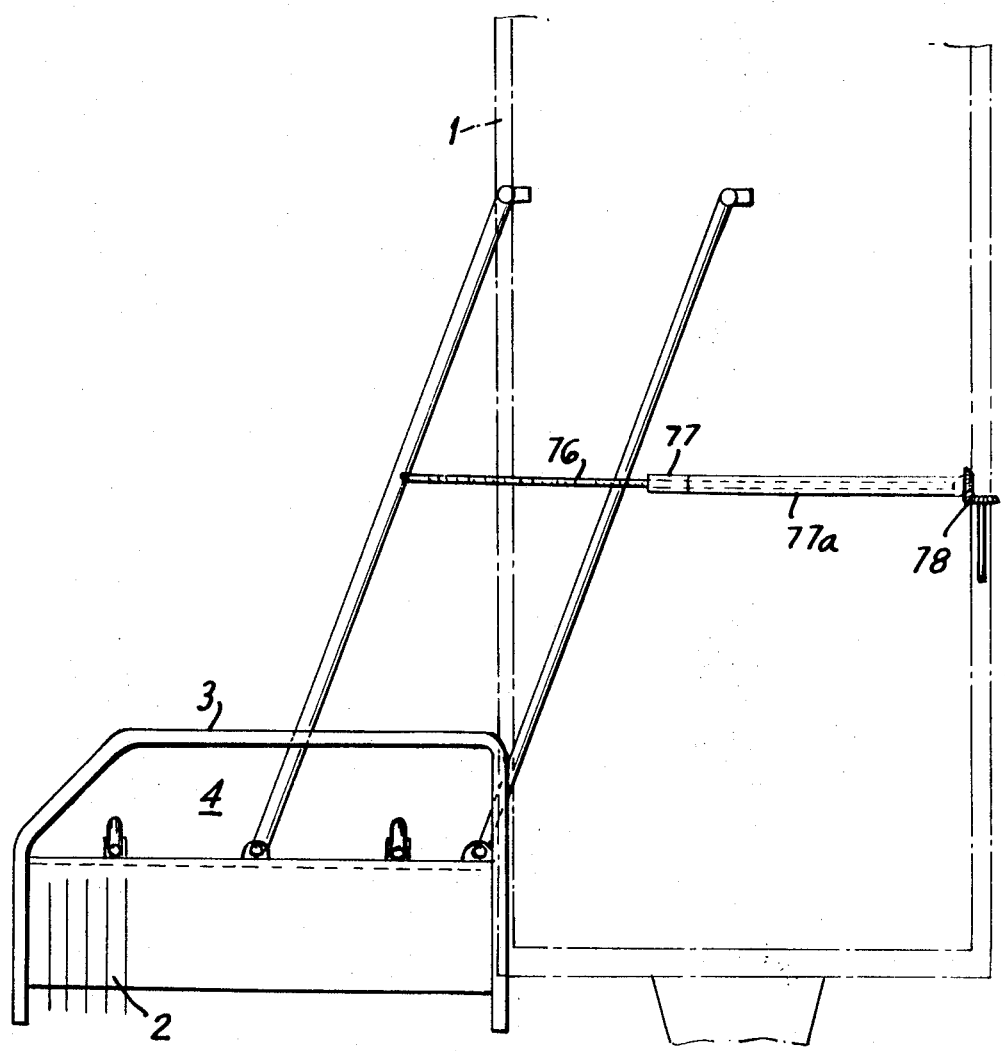
FIG. 31 is a top plan view corresponding to FIG. 30.

In the embodiment of the invention shown in FIGS. 30 and 31, cable winch 64, for lateral movement of receiving drum 2, is replaced by a threaded spindle 76 engaged in the spindle nut 77 connected with a tube 77a which is nonrotatably connected with the drive shaft of a gear 78. This design has the advantage that the adjusted lateral position of receiving drum 2, with respect to vehicle 1, can be stressed for tension and compression so that additional fixing measures are unnecessary.

Figure 34:
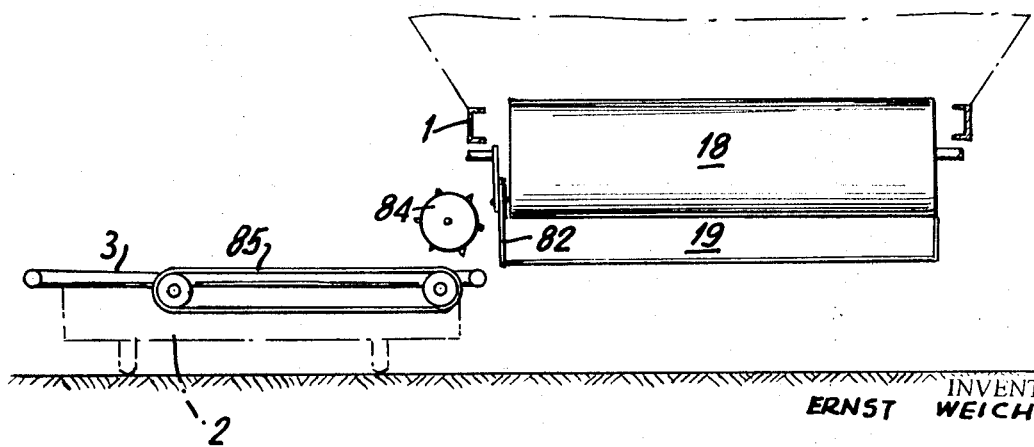
FIG. 34 is a front elevation view of still another embodiment of the invention.
Figure 33:
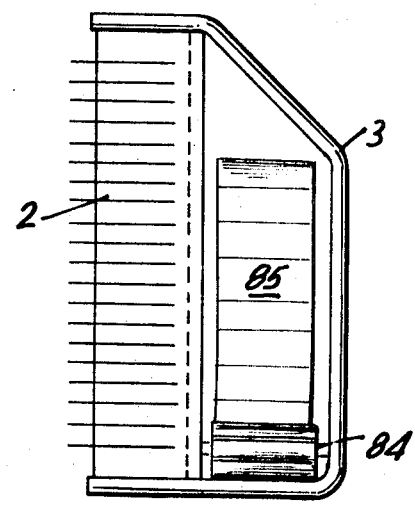
FIG. 33 is a top plan view of still another embodiment of the invention.
Figure 32:
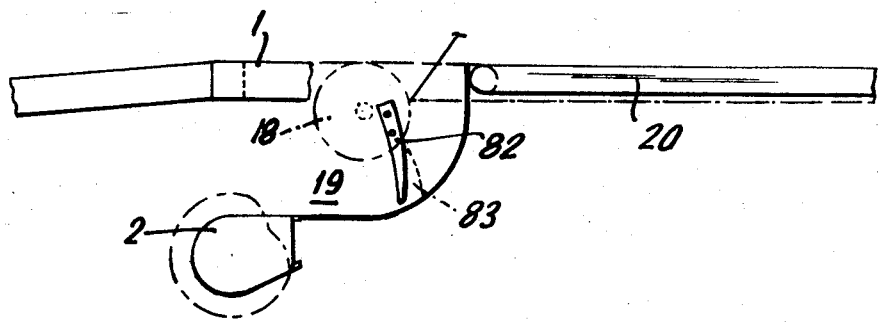
FIG. 32 is a side elevation view of another embodiment of the invention.

FIGS. 32, 33 and 34 illustrate another embodiment of the invention including an additional pressure roll 84 and high speed cutting blades 82 which can cooperate with counterblades 83 and which are arranged outside conveyor duct 19 at the end of a transverse conveyor belt 85. With this arrangement, it is possible to cut, to any size, particularly long-stalked material, which is picked up, for example, in the outer range of receiving drum 2 or of a cutter beam used in place thereof and not shown here, the long-stalked material being turned down by known means, not shown here, transverse to the driving direction, so that it drops lengthwise on transverse conveyor 85 before the material enters conveyor duct 19 and by selecting the speed of cutting blades 82 corresponding to the speed of the transverse conveyor device. This method of operation has the advantage that a very accurate cut is achieved with simple means and that the material is already precut when it arrives in the crop receiving chamber and thus can be processed very easily and with little effort after unloading of vehicle 1.

It will be clear from the foregoing description of the various embodiments that all the harvested material either can be picked up laterally with the invention arrangement on a crop carrying vehicle or, by using a cutter beam ahead of or in place of receiving drum 2, the harvested material can be cut and conveyed to the crop receiving chamber without coming in contact with the ground. Due to the fact that conveyor drum 18 rotates very slowly, in accordance with the invention, and because it no longer has to support the function of receiving the receiving drum, a very gentle treatment of the harvested material and a conveyance into the receiving chamber is possible with the material already precompressed in the lower portion of conveyor duct 19. By these means, very great loading weights and a very general treatment of the loading material are achieved.

METHOD OF OPERATION

Receiving drum 2 can best be extended, after it has been lowered to the ground, by making a left turn so that drum 2 runs on the ground to the right until it strikes against pushrods 8. Several more or less convenient, but also more or less expensive, solutions are provided, in the described embodiments, for again retracting receiving drum 2.

Without any difficulty, it is also possible that the material can be picked with the illustrated arrangement in the track of the tractor, for example, when driving on land studded with trees or when loading on the boundary of properties or on slopes, or the material can be picked laterally next to the track of the tractor. Since the main load of the crop carrying vehicle and the effective load are always in a straight line behind the tractor, optimum driving properties of the vehicle train are ensured even in the case of a lateral pickup.

The laterally operating receiving drum 2 also can have a wider working range than would correspond to the working range of conveyor duct 19 or of the receiving drum 18, arranged, up to now, beneath the floor of the crop carrying vehicle. This has the advantage that the power of the conveyor elements can be utilized better in the direct pickup of material mown laterally next to the track of the tractor.

It is important that the advantages of the filling of a crop chamber by a conveyor duct, whose width corresponds approximately to the width of the crop chamber, from the bottom or top or without regulable pressure are fully maintained.

In accordance with the invention, it is also possible to detach the devices for retracting and extending receiving drum 2 laterally, for example, with a hydraulic lifting cylinder which can be installed in known manner in place of spindle 76 and in a manner similar to that represented in FIGS. 30 and 31. This has the advantage that receiving drum 2 can be displaced somewhat laterally even during operation laterally of the track, and the transverse conveyor device can move partly or entirely over rear wall 19a of conveyor duct 19 and flap 22. The pickup of the material can thus also be effected partly outside of the track of the tractor and partly inside the tractor track. This is of particular advantage when grass must be mown and loaded, for example at the edges of roads, lawns, highways, etc., because it permits a slight yielding in case of trees, boundary stones, boundary poles, railings, etc.

It is also possible, in accordance with the invention, to operate the hydraulic moving device of the receiving drum and conveyor drum by known feeler devices, using known control means and switching means (not shown) in such a way that a feeler stirrup runs in front of the receiving drum at a certain level above the ground, and this effects automatic retraction of the receiving drum or of an attached mower after striking against obstacles, for example, markers, boundary stones, trees, etc. The retraction is effected through the control and switching means to an extent such that the obstacles are bypassed automatically and the receiving drum is extended automatically into the normal operating position after an obstacle has been passed. In this manner, mowing and pickup of harvested material can be effected by one man at a high working speed in the range of obstacles, such as are always found, particularly on roads and in parks as well as in tree cultures, without any damage to the receiving device or the mowing device.

The preliminary compression of the material in conveyor duct 19 during transverse feeding movement, until a control flap 28 with an adjustable pressure can be actuated during temporary standstill of the conveyor device, avoids, initially, accumulations in the transverse conveyance by the conveyor elements traversing the conveyor duct in the longitudinal direction of the vehicle.

For example, the drive of compression device 27 is so designed, in dependence on the drive of the conveyor drum 18, that the thrust of both elements is effected in alternating cycles. In this manner, a uniform filling of the left and right side of the loading chamber can be attained, though the pickup of the harvested material is effected exclusively laterally of the loading or crop receiving chamber.

Since a conveyor stroke of the conveyor drum 18 is necessary only, in this method of operation, when the transverse conveyor duct is completely filled with material, the material is touched with an absolute minimum by the conveyor elements and thus treated very gently. In addition, only uniform portions of precompressed material of equal size are conveyed into the crop receiving chamber, which comes easily disassembled during unloading. This method of operation results not only in a lower power consumption of the entire machine but also in an optimum gentle treatment of the loading material.

The possibility of cutting bulky material eliminates the present disadvantage of crop carrying vehicles in that they are not equally suitable for beet leaves, grass, hay and so forth as they are for bulky material, lie sugar cane, topinambur, corn, etc.

While specific embodiments of the invention have been shown and described to illustrate the application of the principles of the invention, it will be understood that the invention may be embodied otherwise without departing from such principles.

I claim:

1. In a tractor-drawn crop carrying vehicle having a load receiving surface, a conveyor duct having a forwardly directed inlet and a lateral inlet and discharging upwardly onto the load receiving surface and having a width coextensive with that of the load receiving surface, conveying means operable in the conveyor duct to move harvested material along the duct to the load receiving surface, a crop receiving drum, a frame mounting the receiving drum, and a transverse conveyor device conveying material from the receiving drum to the conveyor duct: the improvement comprising, in combination, means mounting said frame on said vehicle for movement between a first position, in which said drum extends perpendicularly to the path of vehicle movement and completely to one side of the vehicle and is in material-feeding communication with said lateral duct inlet, and a second position, in which said drum also extends perpendicularly to the direction of vehicle movement but is retracted beneath the vehicle; and said drum is in material-feeding communication with said forwardly directed duct inlet; and releasable bracing means maintaining said frame in each of the first and second positions.

2. In a tractor-driven crop carrying vehicle, the improvement claimed in claim 1, which the lengths of said receiving drum and said transverse conveyor device, measured transversely of the direction of vehicle movement, are greater than the width of said crop carrying vehicle.

3. In a tractor-drawn crop carrying vehicle, the improvement claimed in claim 1, in which said transverse conveyor device has a bottom wall adjoining said receiving drum and an upright rear wall bordering said bottom wall; and mechanical conveyor means in the range of said rear wall acting to move material in a direction transversely of the direction of vehicle movement.

4. In a tractor-drawn crop carrying vehicle, the improvement claimed in claim 1, in which said conveyor duct has a forwardly directed inlet; and a movable flap operable to close said forwardly directed inlet when said frame is in its first position in which said receiving drum extends completely to one side of said vehicle.

5. In a tractor-drawn crop carrying vehicle, the improvement claimed in claim 1, in which said conveyor duct has a lateral inlet adjoining said transverse conveyor device; and a movable flap operable to close said lateral inlet when said conveyor duct is being charged from the front.

6. In a tractor-drawn crop carrying vehicle, the improvement claimed in claim 1, including an additional conveying and compression device extending along said vehicle above said transverse conveyor device; said conveyor duct having a lateral inlet communicating with said transverse conveyor device; said additional conveying and compression device conveying material in the direction of said lateral inlet and transverse to the conveying directions of said conveying means operable in said conveyor duct.

7. In a tractor-drawn crop carrying vehicle, the improvement claimed in claim 1, in which said conveying means operable in said conveyor duct is a conveyor drum; and driving means operable to drive said conveyor drum intermittently.

8. In a tractor-drawn crop carrying vehicle, the improvement claimed in claim 7, including control means operable to start said driving means; and a control flap in said conveyor duct and operable, response to pressure of material thereon, to actuate said control means to start operation of said driving means.

9. In a tractor-drawn crop carrying vehicle, the improvement claimed in claim 1, in which said conveyor duct includes relatively movable cooperable wall parts latchable in predetermined relation to vary the effective interior surface of said conveyor duct in the receiving range of said conveying means operable in said conveyor duct.

10. In a tractor-drawn crop carrying vehicle, the improvement claimed in claim 1, in which said frame mounting means comprises pushrods arranged as a parallelogram.

11. In a tractor-drawn crop carrying vehicle, the improvement claimed in claim 10, including releasable locking means on said frame cooperable with said push rods to releasably lock said frame in either its first position or its second position.

12. In a tractor-drawn crop carrying vehicle, the improvement claimed in claim 10, in which at least one of said push rods is designed as a Cardan drive shaft.

13. In a tractor-drawn crop carrying vehicle, the improvement claimed in claim 1, including crop cutting means positioned in the area of the transition between said transverse conveyor device and said conveyor duct.

14. In a tractor-drawn crop carrying vehicle, the improvement claimed in claim 1, in which said means mounting said frame includes a carriage; guide means extending transversely of said vehicle and supporting said carriage for movement transversely of said vehicle; and cable means connected to said frame and to said carriage.

15. In a tractor-drawn crop carrying vehicle, the improvement claimed in claim 1, in which said means mounting said frame comprises a threaded spindle and a nut threaded on said spindle, one of said spindle and said nut being secured to said frame and the other of said spindle and said nut being secured to said vehicle whereby, upon relative rotation of said nut and said spindle said frame is moved between its first and second positions.

16. In a tractor-drawn crop carrying vehicle, the improvement claimed in claim 1, in which said means mounting said frame comprises a hydraulic piston-cylinder arrangement connected between said frame and said vehicle for moving said frame between its first and second positions.

17. In a tractor-drawn crop carrying vehicle, the improvement claimed in claim 1, including feeler means and associated control means operatively associated with said frame and operable, responsive to said feeler means striking obstacles, to effect movement of said frame to clear said obstacles.

18. In a tractor-drawn crop carrying vehicle having a load receiving surface, a conveyor duct discharging upwardly onto the load receiving surface and having a width coextensive with that of the load receiving surface, conveying means operable in the conveyor duct to move harvested material along the duct to the load receiving surface, a crop receiving drum, a frame mounting the receiving drum, and a transverse conveyor device conveying material from the receiving drum to the conveyor duct: the improvement comprising, in combination, means mounting said frame on said vehicle for movement between a first position, in which said drum extends perpendicularly to the path of vehicle movement and completely to one side of the vehicle, and a second position, in which said drum also extends perpendicularly to the direction of vehicle movement but is retracted beneath the vehicle; and releasable bracing means maintaining said frame in each of the first and second positions; said transverse conveyor device including a bottom wall and an upright wall bordering said bottom wall and extending above the lowermost portion of the surface of said conveyor duct; said upright wall comprising telescopic components which can be telescoped into each other when said frame is moved from its first position into its second position in which it is retracted beneath the vehicle.